Jan. 4, 1927.                      B. SEILER                      1,613,484
                              TRANSMISSION CASE
                              Filed May 16, 1925
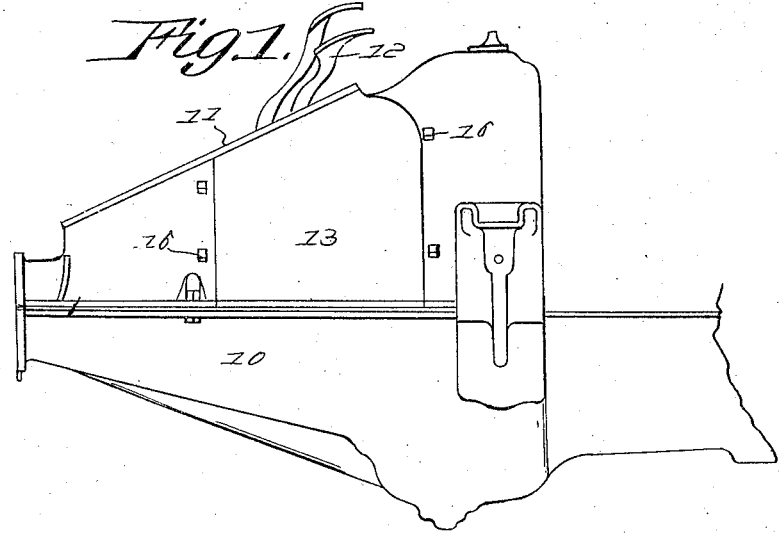
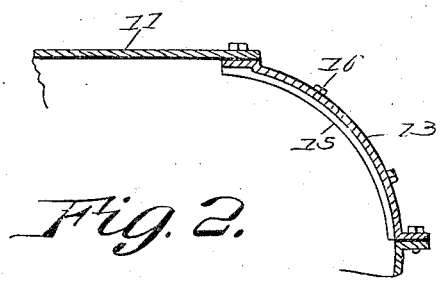   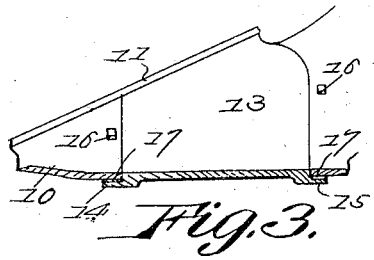
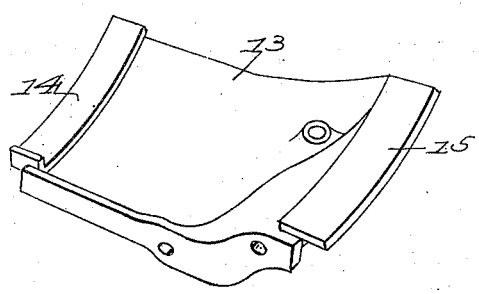
Inventor
Bert Seiler,
By
Attorney Patented Jan. 4, 1927.

1,613,484

UNITED STATES PATENT OFFICE.

BERT SEILER, OF ALGOMA, WISCONSIN.

TRANSMISSION CASE.

Application filed May 16, 1925. Serial No. 30,746.

The object of the invention is to provide a transmission case for automobiles whereby access may be had to the brake and transmission bands for the replacement, repair or adjustment thereof without the inconveniences ordinarily involved in such operations and particularly residing in the removal or disconnection of the pedals and like operating elements of the structure; and with this object in view the invention consists in a construction and combination of parts of which a preferred embodiment is shown in the accompanying drawings, wherein:—

Figure 1 is a side view of a transmission gear case having a construction embodying the invention.

Figure 2 is a detail transverse sectional view of the cap plate and adjacent portions of the gear case.

Figure 3 is a sectional view of the cap plate taken longitudinally of the gear case.

Figure 4 is a perspective view of the removable cap plate.

The case 10 which is provided with the usual cover plate 11 and carries the operating pedals 12 is also provided in one side with an opening fitted with a removable cap plate 13 having at its rear end an attaching flange 14 and at its front end with an arcuate angularly disposed attaching flange 15, adapted to be secured to the walls of the casing by cap screws 16 and adapted for removal independently of the cover plate to expose the interior of the casing and thereby give direct access through the mechanism for the adjustment or replacement of the brake and transmission bands.

The air tight seating of the cap plate may be effected by the interposition between the inner surface thereof and the wall of the casing of a suitable gasket 17 which obviously may be renewed if necessary upon each removal of the cap plate, but should be positioned with care when the cap plate is restored to its proper position, in order that wastage of the lubricating oil may be avoided.

Having described the invention, what is claimed as new and useful is:—

A transmission gear case having a removable cover plate and also a side removable cap plate covering a lateral opening in the wall of the case, said cap plate being provided with terminal attaching flanges extending behind and overlapping the case walls at the forward and rear ends of the opening, and cap screws extending through the wall of the case and engaging said flanges, the cover plate abutting the cap plate on the upper edge and being secured to the latter.

In testimony whereof he affixes his signature.

BERT SEILER.